United States Patent [19]
Oka et al.

[11] 3,958,103
[45] May 18, 1976

[54] AUTOMATIC TICKET VENDING SYSTEM

[75] Inventors: Akira Oka, Kyoto; Noriaki Minami, Osaka; Sigehiro Kondou, Kyoto; Hirosi Nakatsuka, Kyoto; Hirosi Egasira, Kyoto; Mamoru Hirayama, Osaka; Yasunori Hayasi; Kazunobu Otsukawa, both of Kyoto, all of Japan

[73] Assignee: Omron Tateisi Electronics Co., Kyoto, Japan

[22] Filed: May 23, 1974

[21] Appl. No.: 472,672

[30] Foreign Application Priority Data
May 31, 1973 Japan.............................. 48-61497

[52] U.S. Cl........................... 235/61.8 R; 194/4 R; 340/152 R; 235/61.7 B
[51] Int. Cl.²...................... G07F 1/06; G06K 1/12; G06K 7/08
[58] Field of Search................ 235/61.7 B, 61.11 A, 235/61.11 B, 61.11 D, 61.11 E, 61.7 R, 61.8, 61.6 J; 177/5; 194/4; 340/152; 346/44

[56] References Cited
UNITED STATES PATENTS

| | | | |
|---|---|---|---|
| 2,783,865 | 3/1957 | Cleave | 194/4 |
| 3,212,615 | 10/1965 | Hellar | 194/4 |
| 3,483,361 | 12/1969 | Blurton | 235/61.6 J |
| 3,559,175 | 1/1971 | Pomeroy | 340/152 |
| 3,560,715 | 2/1971 | Akamatsu | 235/61.8 |
| 3,634,656 | 1/1972 | Krechmer | 235/61.7 B |
| 3,635,297 | 1/1972 | Salava | 177/5 |
| 3,740,759 | 6/1973 | McKeegan | 346/44 |
| 3,754,119 | 8/1973 | Scott | 235/61.6 R |

*Primary Examiner*—Daryl W. Cook
*Assistant Examiner*—Robert M. Kilgore
*Attorney, Agent, or Firm*—Christensen, O'Connor, Garrison & Havelka

[57] ABSTRACT

An automatic ticket vending system in which a stored value card previously issued to a customer is used to purchase a ticket which can be used in the existing conventional automatic ticket gate in which the tickets purchased from an ordinary coin-actuated ticket vending machine are used. When the card is used to purchase a ticket, the fare of the ticket purchased is subtracted from the monetary value of the card.

2 Claims, 3 Drawing Figures

AUTOMATIC TICKET VENDING SYSTEM

This invention relates to an automatic ticket vending system and more particularly to a system wherein a stored value card is used to purchase a railway ticket or the like from an automatic ticket vending machine.

Various machines or systems are known for automatic vending and examination of tickets at railway stations or the like establishments. In one of such systems stored value tickets or cards are use. The stored value card is a card to which a certain monetary value is given. The card usually has an area in which the value is magnetically recorded and another area in which the station of entry, that is, the station at which the holder of the card gets on the train is magnetically recorded.

In the stored value card system, when the entrance gate receives a stored value card, the gate checks if the card is proper and permits passage of the passenger through the gate if the card is found proper and at the same time prints the name of the station of entry on the card and returns the card to the holder.

When the exit gate receives the card, the gate checks if the card is proper and permits exit of the passenger through the gate if the card is proper. At the same time, the station of entry recorded on the card is read so as to determine the distance of the trip made by the passenger, calculate the fare, subtract the fare from the value the card then has, record the result of subtraction in substitution for the previous value on the card and then return the card to the owner of the card. This means that in the stored value card system, the manner of handling the card at the entrance gate is different from that at the exit gate. Therefore, it is essential that both the entrance and the exit gates should make no errors in operation. Since any error in recording of the station of entry where the holder of the card gets on the train or calculation of the fare from the entrance to the exit stations can be found out only at the exit gate, it is impossible to know which of the entrance and exit gates has made the error.

Generally speaking, the characteristic feature of the known automatic ticket gate which handles ordinary tickets or commutation tickets is that they check if the ticket used is proper and accordingly control passage of the passengers through the gates, while that of the automatic gate handles the stored value card is that the monetary value of the card is changed or reduced each time it is used for a ride. The two types of gates are quite different in construction and operation. Therefore, if the stored value card is to be employed in the existing ticket examination system for ordinary and/or commutation tickets, it would be necessary to provide a separate gate which can handle the stored value card besides the existing ticket gates which handle the ordinary and/or commutation tickets. This would require an extra cost and space for installation of the ticket gate for the stored value card. Furthermore, since one more kind (that is, the stored value card) would be added to the existing two kinds (that is, the ordinary ticket and the commutation ticket) and the holder of a stored value card and the holder of an ordinary ticket or a commutation ticket would have to use different ticket gates, that is, they could use only that particular type of ticket gate which could handle the kind of card or ticket they had. This would not only make the passengers confused but also cause confusion to passage through the gate.

Accordingly, the primary object of the invention is to provide an automatic ticket vending system in which a stored value card is used to purchase a ticket which can operate a conventional automatic ticket gate which handles ordinary tickets and/or commutation tickets.

The ticket vending machine of the invention receives a stored value card having a magnetic recording area in which a certain monetary value is recorded. When the card is inserted into the card receiving portion of the machine, the value is read and a ticket is produced, the value of which is within the monetary value of the card and which can be used in a conventional automatic ticket gate. At the same time, the value of the ticket sold is subtracted from the value of the card and the resultant monetary value is recorded on the card in place of the previously recorded value, and then the card is returned to the owner.

Thus, in accordance with the invention, automatic handling of multiple ride tickets can be effected, and since the existing conventional automatic ticket gates can be used without materially changing the structure and mechanism thereof, passengers are not confused in finding out the ticket gates through which they are to pass. Handling of the stored value card is finished in one operation of one apparatus, that is, a card-actuated automatic ticket vending machine. The space for installation of the apparatus need not be very large. When the card-actuated automatic ticket vending machine has made an error in operation, it can be known instantly. The manufacturing cost of the card-actuated automatic ticket vending machine constructed in accordance with the invention is lower than that of the conventional automatic ticket examining system which handles stored value cards. In accordance with the invention, the card-actuated automatic ticket vending machine must be provided besides the conventional coin-actuated automatic ticket vending machine, so that there will be two types of ticket vending machines. However, since the card is quite different from the coin, it will seldom happen that the two types are confused.

The ticket purchased from the machine of the invention has necessary data such as the distance of the ride or trip and the term of availability of the ticket recorded thereon both magnetically and is visible symbols, so that it is possible to use the ticket at a station where no automatic gate is installed.

The other objects, features and advantages of the invention will become clear from the following description of a preferred embodiment thereof with reference to the accompanying drawings, wherein.

Figure 1:
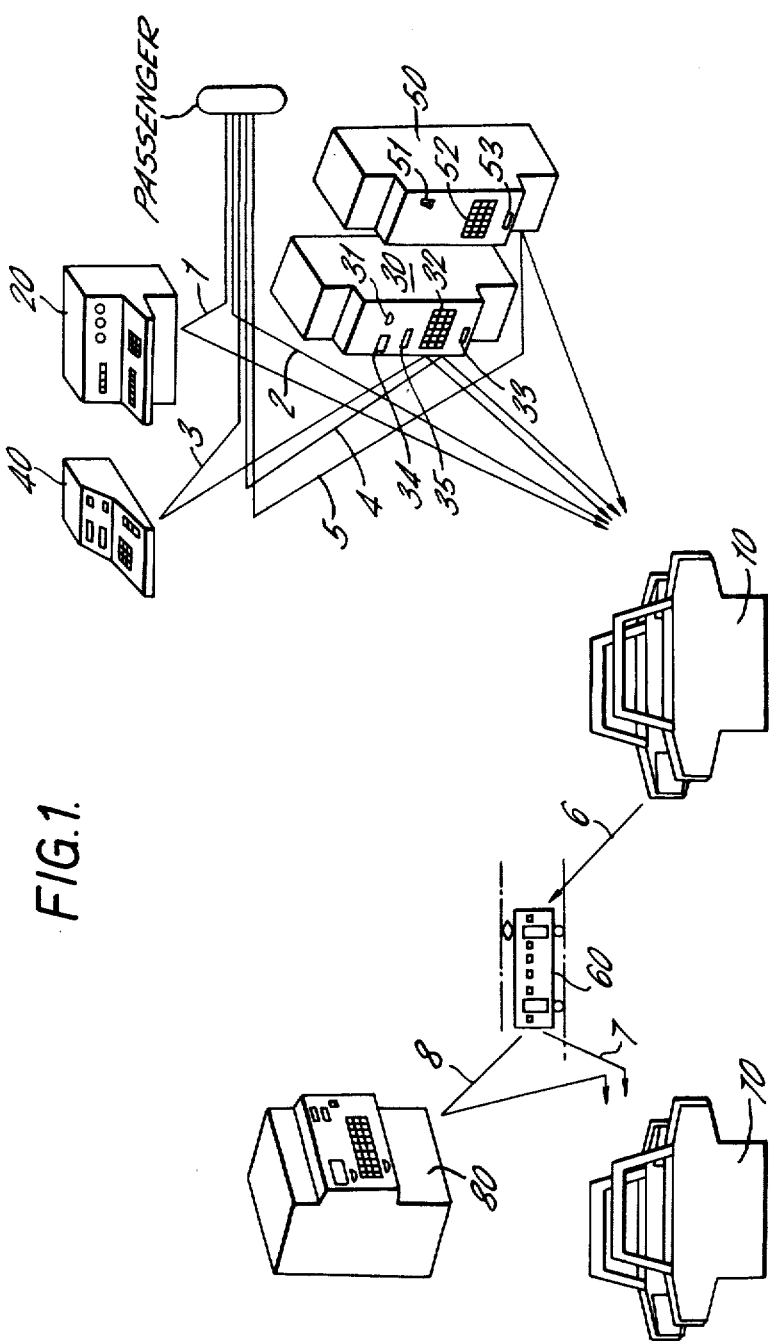
FIG. 1 shows a schematic perspective view of a railway ticket handling system in which the card-actuated automatic ticket vending machine of the invention is employed.

Referring now in detail to the drawings, first to FIG. 1, which schematically shows the general layout of the system in accordance with the invention as viewed from the movement of a passenger who utilizes the system.

The line 1 shows a path the passenger follows as he buys a commutation ticket and goes to an automatic ticket gate 10. The passenger who wishes to buy a commutation ticket goes to a window where a commutation ticket issuing machine 20 is provided and writes required information on an application form and hands the form to an official in charge of the issuing business. The official operates the machine 20 in accordance with the information on the application form. The machine prepares the required ticket, on which a certain necessary information is magnetically recorded. The official then hands the ticket produced by the issuing machine 20 to the customer in exchange for the required amount of cash. The customer with the ticket goes to the automatic ticket gate.

The line 2 indicate a path a passenger who already has his commutation ticket follows as he goes to the ticket gate 10.

The line 3 shows a path a passenger follows as he buys a stored value card (which will be referred to merely as a card) and operates a card-actuacted automatic ticket vending machine 30 and then goes to the automatic ticket gate 10. The passenger who wishes to buy a card goes to a window where a card issuing machine 40 is provided and asks the official for a card having a desired monetary value. The official operates the issuing machine 40 accordingly, which issues a card in which the required monetary value is magnetically recorded. In this case, the card may be issued with an extra monetary value in addition to the money paid by the customer. For example, for $10 paid by the customer the card may have a value of $11, with $1 being added free of charge. It is also possible to issue, in exchange for the old card that has until then been used by the customer, a new card to the value of which the value of the old card is added. The official hands the issued card to the customer in exchange for cash.

In addition to the magnetic recording of the monetary value the card has a value recorded in visible figures and a guide perforation to indicate from which side the card is to be inserted into the automatic ticket issuing machine.

The passenger with the purchased card goes to a card-actuated automatic ticket vending machine 30 and inserts his card into a card inlet 31 provided thereon and then operates a push-button switch board 32. The machine 30 receives the card put thereinto by the customer, reads the monetary value recorded on the card, indicates the value in an indicator 34 and delivers onto a tray 33 a ticket selected by the customer within the indicated value and at the same time subtracts the value of the purchased ticket from the initial value read from the card and writes on the card the resulting value as the new monetary value the card now has, and sends the card onto the tray 33. Instructions to be given to the passenger are indicated in a panel 35. The passenger picks up the ticket and the card out of the tray 33 and proceeds towards the automatic ticket gate 10.

The line 4 indicates a path the passenger who already has his card follows as he goes to the card-actuated ticket vending machine 30 and thence to the ticket gate 10.

The line 5 shows a path the passenger follows as he buys a ticket from a coin-actuated automatic ticket vending machine 50 and thence goes to the automatic ticket gate 10. The customer drops coins into a coin inlet 51 provided on the machine 50 and operates a push-button switch board 52 in accordance with the fare of the ticket he wishes to buy. The machine 50 operates and counts the coins introduced through the inlet 51, and compares the counted value of the coins and the fare of the ticket selected and delivers onto a tray 53 the ticket and change if required, or the ticket alone if no change is required. The passenger takes up the ticket and change if any and goes to the automatic ticket gate 10.

The ticket delivered onto the tray 33 or 53 has necessary information magnetically recorded thereon. The ticket vended by the card-actuated machine 30 and the ticket vended by the coin-actuated machine 50 may be of the same type if they have the same value. With this arrangement, the ticket issuing devices of the card-actuated automatic vending machine 30 and the coin-actuated vending machine can be of the same construction. If in the coin-actuated ticket vending machine 50, the device for counting the coins introduced is replaced by a device for reading the monetary value of a card and the change calculating and delivering device, by a device for calculating and writing the remaining monetary value of the card, a card-actuated ticket vending machine will be obtained without changing many parts of the machine.

The automatic ticket gate 10 is so arranged as to receive both ordinary tickets and commutation tickets, read the information recorded thereon, control passage of the passengers through the gate inaccordance with the read information and return the ticket to the owner.

The line 6 indicates a path the passenger who has passed the automatic ticket gate 10 follows as he goes to a train 60.

The line 7 indicates a path the passenger follows as he gets out of the train 60 to go to an automatic ticket gate 70 installed on the exit station.

The line 8 indicates a path an out-tripped passenger follows as he goes to an automatic fare adjusting machine 80 to pay the extra fare and thence to the automatic ticket gate 70.

The automatic fare adjusting machine 80 receives an ordinary ticket or a commutation ticket, calculates the extra fare for the out-trip made by the passenger, receives the required amount of money and issues an adjusted ticket. At this time if the original ticket is an ordinary ticket, it is collected at the gate, but if it is a commutation ticket, it is returned to the owner The passenger with the adjusted ticket issued by the automatic fare adjusting machine 80 passes the automatic ticket gate 70.

The automatic ticket gate 70 receives the ordinary ticket, the commutation ticket or the fare-adjusted ticket and collects the ordinary ticket and the fare-adjusted ticket but returns the commutation ticket to the owner. The automatic ticket gate 70 also reads the information recorded on these tickets and accordingly controls passage of the passenger through the gate.

Figure 2:
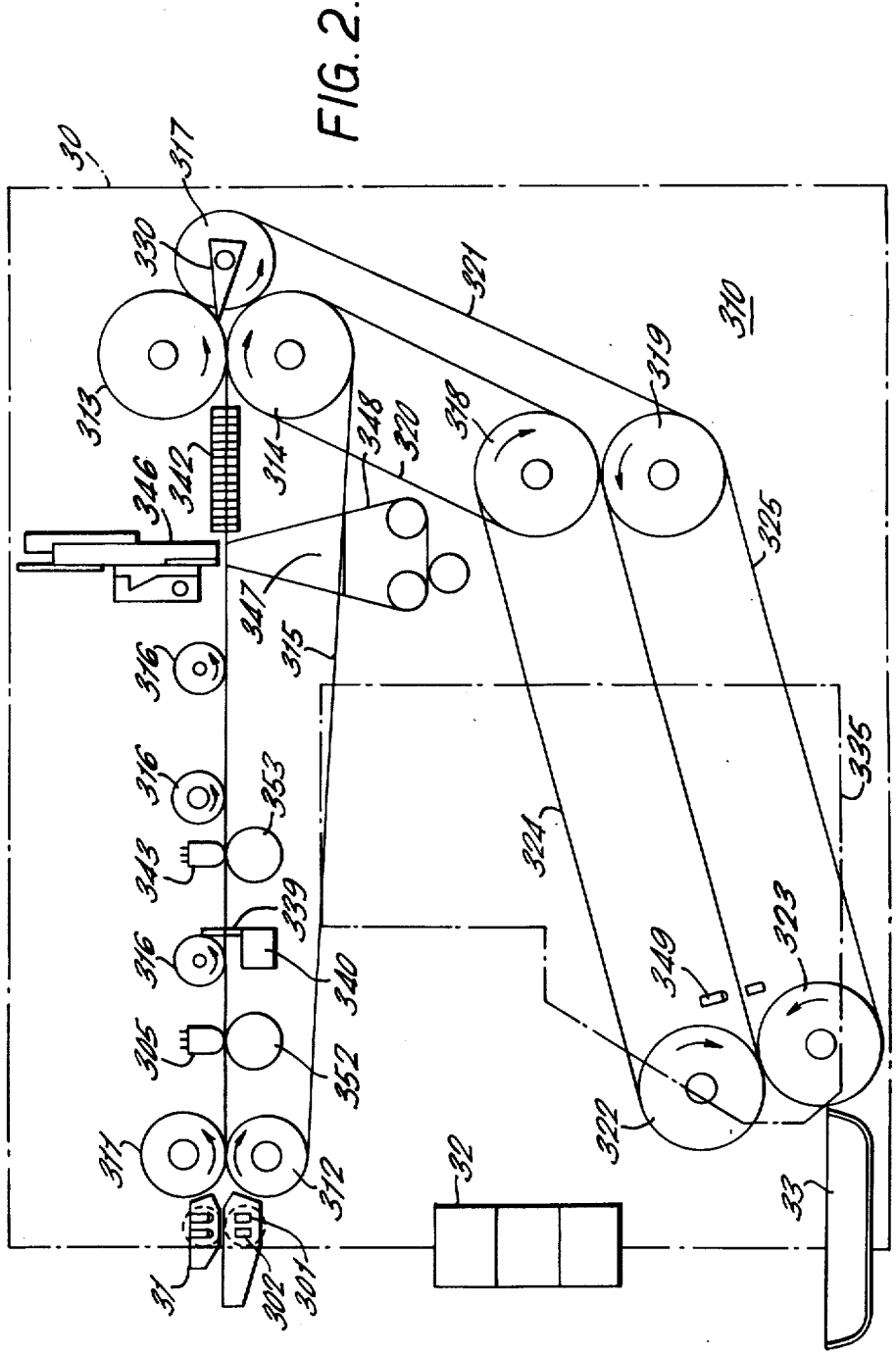
FIG. 2 is a side view of the interior mechanism of the ticket vending machine of the invention.
Figure 3:
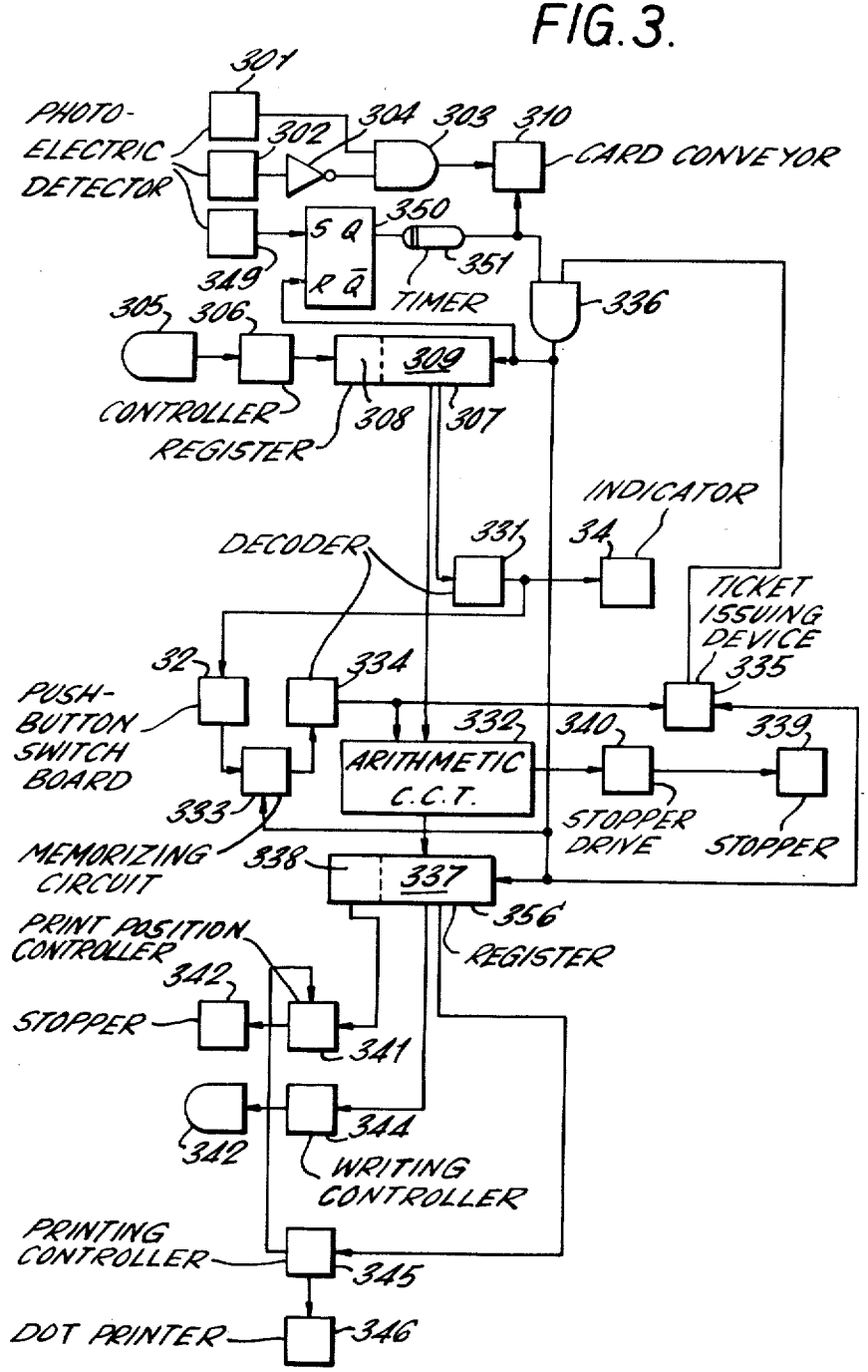
FIG. 3 is a block diagram of the control circuit of the ticket vending machine of FIG. 2.

FIG. 2 shows the structure of the card-actuated automatic ticket vending machine 30 constructed in accordance with the invention and FIG. 3 is a schematic block diagram of the control circuit of the machine.

Just inside the card inlet 31 there are provided a photoelectric detector 301 which detects a card introduced to produce an output signal and a photoelectric detector 302 which detects a hole in the card to produce an output signal. The output signal from the photoelectric detector 301 is applied to one input of an AND element 303, to the other input of which the output signal from the photoelectric detector 302 is applied through a NOT element 304.

When a card is inserted through the card inlet 31, the forward end thereof touches an upper roller 311 and a lower pulley 312 provided just beyond the photoelectric detectors 301 and 302, so that the card can not be inserted any farther. If the card introduced is proper and inserted in proper position, the photoelectric detector 301 produces an output signal but the other photoelectric detector 302 produces no output signal, so that the NOT element 304 which inverts the output waveform of the photoelectric detector 302 produces an output, whereupon the AND element 303 receives an input at both its input terminals to produce an output signal.

The output signal of the AND element 303 starts a card conveying device 310, which draws the card inwardly of the machine 30. The conveying device 310 continues its operation until a reset signal is received.

The card conveying device 310 comprises: the previously mentioned upper roller 311 and lower pulley 312; an upper roller 313 and a lower pulley 314 provided farther inward; a belt 315 connecting the pulley 312 and 314; a plurality of rollers 316 provided on the belt 315 along the path of the card so as to help convey the card on the belt; a pulley 317 with a guide 330 provided just behind the roller 313 and the pulley 314 for changing the direction in which the card is conveyed; an upper pulley 318 and a lower pulley 319 provided a little forwardly below the pulley 314; a belt 320 connecting the pulleys 314 and 318; a belt 321 connecting the pulleys 317 and 319; a pulley 322 provided farther forwardly and a little below the pulleys 318 and 319 a little rearwardly above the tray 33; a pulley 323 provided below the pulley 322; a belt 324 connecting the pulleys 318 and 322; a belt 325 connecting the pulleys 319 and 323; and a motor (not shown) for driving the above-mentioned rollers and pulleys.

Behind the roller 311 there is provided a magnetic head 305 for reading the information magnetically recorded on the card. The magnetic head 305 is controlled by a controller 306 to read information magnetically recorded on the card. The information read by the magnetic head 305 is stored in a register 307. A portion 308 of the information stored in the register 307 indicates the position where the monetary value of the card was previously printed in visible figures, while the remaining portion 309 of the information indicates the monetary value of the card.

The information 309 is transferred through a decoder 331 to the push-button switch board 32 and the indicator 34. The board 32 includes a plurality of push-button switches corresponding to the different fares of the tickets being sold, so that those of the push-buttons are lighted which correspond to the value of a ticket that can be purchased within the monetary value indicated by the information 309. The indicator 34 expresses in figures the monetary value indicated by the information 309.

The informations 308 and 309 stored in the register 307 are also given to an arithmetic circuit 332.

When the passenger presses that one of the lighted push-buttons which corresponds to the fare for the trip he wishes to make, a memorizing circuit 333 memorizes which of the push-buttons has been pushed. The memorized value in the circuit 333 is applied through a decoder 334 to a ticket issuing device 335 and the arithmetic circuit 332.

The decoder 334 converts the value memorized by the memorizing circuit 333 to the fare for the trip the passenger wishes to make. On the basis of the fare provided by the decoder 334, the ticket issuing device 335 makes a ticket for the trip the passenger has selected and delivers the ticket onto the ray 33, while simaltaneously applying a signal as one input to an AND element 336. This signal continues till it is reset.

A control circuit (not shown) for the push-button switch board 32 is so arranged that when the passenger pushes any of the push-buttons which are not lighted, the memorizing circuit 333 does not memorize the pushed button, so that the ticket issuing device 335 does not operate.

The ticket issued has the distance of the ride allowable, the term of availability, etc. recorded both in magnetic code and in visible printed symbols.

The arithmetic circuit 332 receives the informations 308 and 309 stored in the register 307 and the information from the decoder 334 based on the value memorized in the memorizing circuit 333 and subtracts from the monetary value indicated by the information 309 the fare of the ticket selected by the passenger and applied to the circuit 332 through the decoder 334. The result of the subtraction is applied to a register 356 to be registered at a predetermined position therein as an information 337, and at the same time the information 308 has 1 added thereto and is registered as an information 338 at a predetermined position in a register 356.

The information 337 is the monetary value to be newly magnetically recorded in a predetermined magnetic recording area of the card instead of the previously recorded monetary value.

The information 338 indicates the position in the card where the monetary value is to be printed as visible figures. When the information 338 has been registered, a printing position control device 341 causes one of a plurality of stoppers 342 to project in the path of the card. The group of stoppers 342 are arranged along the path of the card in front of the upper roller 313 and the lower pulley 314 so that each of the stoppers corresponds to one of the rows on the card in which the monetary value of the card is to be printed. For example, where the third stopper from the left end in FIG. 2 is driven by the printing position control device 341 to project in the path of the card, the value which the card now has is printed in visible figures in the third line on the card.

After the arithmetic circuit 332 has applied the information 337 and 338 to the register 356 to be stored therein, it produces a signal to actuate a drive 340 for operating a stopper 339 for a predetermined period of time. The stopper 339 is now projecting in the path of the card behind the magnetic head 305 thereby stopping the card the information on which the magnetic head 305 has read. When the drive 340 operates, the stopper 339 is withdrawn out of the way of the card, so that the conveyor 310 conveys the card farther on.

When the card has passed over the stopper 339, it again projects to the original position. Then the card passes a magnetic head 343 provided on the belt 315 behind the stopper 339, whereupon the magnetic head 343 is controlled by a writing controller 344 to magnetically record the informations 337 and 338 stored in the register 356 at a predetermined position on the card.

The card with the magnetically recorded data is then stopped by one of the stoppers 342, whereupon a printing controller 345 operates a dot printer 346 on the basis of the information 337 stored in the register 356. The dot printer is disposed behind the magnetic head 343 and in front of the stoppers 342, facing across the path of the card an ink ribbon 348 held by a ribbon support 347. The dot printer 346, the ink ribbon 348 and the stoppers 342 cooperate to print the monetary value the card now has at a predetermined position on the card in visible figures.

When the printing is finished, the printing controller 345 produces a print completion signal to be applied to a print position controller 341, whereupon the controller 341 is reset and the stopper is withdrawn out of the path of the card.

The card is then conveyed to the upper roller 313 and the lower pulley 314, where the card is deflected by the guide 330 and sandwiched between the belts 320 and 321 to be conveyed to the upper and lower pulleys 318 and 319. Then the card is received between the belts 324 and 325 and delivered through the upper and lower pulleys 322 and 323 onto the tray 33.

A photoelectric detector 349 provided just behind the pulleys 322 and 323 detects the card before the card passes the pulleys. When the photoelectric detector 349 detects the card, it produces a signal to set a flip-flop 350, the set output of which is applied to a timer 351. The timer 351 produces a signal a predetermined period of time after the flip-flop 350 was set. The time after the timer received the signal before it produces a signal is set equal to the time from when the card is detected by the photoelectric detector 349 till the card is sent out onto the tray.

The output signal of the timer 351 stops the card conveyor 310 and is also applied to one input of the AND element 336, to the other input of which the ticket issuing device 335 applies a signal when the device has finished issuing a ticket.

When the ticket issuing device 335 has delivered a ticket out onto the tray 33 and the card is returned to the tray, the AND element 336 produces a signal, which resets the flip-flop 350, the register 307, the memorizing circuit 333, the register 356 and the ticket issuing device 335, so that the whole system is restored to its original condition.

Rollers 352 and 353 are provided to press the card against the magnetic heads 305 and 343 for a better contact therebetween. Needless to say, a photoelectric detector, not shown, is provided at a suitable position in the path of the card to provide timing signals for the magnetic recording and the visible printing.

What we claim is:

1. An automatic ticket vending apparatus, responsive to cards having a monetary value, for dispensing tickets useful in automatic ticket gate commutation systems, said apparatus comprising:
    means for receiving a card presented to said apparatus by a customer, said card having a first monetary value recorded thereon in the form of machine readable symbols and visible symbols;
    means for reading said first monetary value on said presented card;
    means for entering into the apparatus a second monetary value corresponding to the value of the trip desired by the customer;
    means for subtracting said second monetary value from said first monetary value to obtain a third monetary value;
    means for recording said third monetary value on said card in the form of machine readable symbols and visible symbols and for recording machine-readable positional data on said card, said positional data including the location of the current recordation of said visible symbols;
    means for aligning said presented card in the apparatus such that said machine readable symbols and said visible symbols may be recorded on said card in predetermined positions, said aligning means being operative to position said card for successive uses thereof relative to said recording means so that said visible symbols are recorded in successive locations on said card each time the card is used, for ease of inspection by the customer, said aligning means being responsive to said positional data during the next successive use of said card to position said card such that said visible symbols are recorded in the next successive location therefor.

2. The apparatus of claim 1, including means defining a conveyor for movement of said card in said apparatus, said conveyor means operative to draw said card into the apparatus from said receiving means, said conveyor means passing said card by said recording means and said aligning means, wherein said aligning means includes a plurality of stopping means capable of stopping said card on said conveyor means in a plurality of positions relative to said recording means and wherein said aligning means further includes means operative in response to said positional data to energize one of said plurality of stopping means so as to stop said card in such a position that visible symbols are recorded in the next successive location of recordation on said card.

* * * * *